(12) United States Patent
Nyhus

(10) Patent No.: US 7,174,592 B1
(45) Date of Patent: Feb. 13, 2007

(54) MULTI-FUNCTIONAL RAMPS

(76) Inventor: Michael E. Nyhus, 2849 4th St., Cumberland, WI (US) 54829

( * ) Notice: Subject to any disclaimer, the term of this patent is extended or adjusted under 35 U.S.C. 154(b) by 10 days.

(21) Appl. No.: 11/042,631

(22) Filed: Jan. 26, 2005

(51) Int. Cl.
*E01D 1/00* (2006.01)
*E01D 15/00* (2006.01)

(52) U.S. Cl. ........................................ 14/69.5; 414/537

(58) Field of Classification Search ................ 14/69.5; 414/254, 537, 88
See application file for complete search history.

(56) References Cited

U.S. PATENT DOCUMENTS

| | | |
|---|---|---|
| 4,290,728 A | 9/1981 | Leduc |
| 4,478,549 A | 10/1984 | Stelly et al. |
| D331,305 S | 11/1992 | Woodward et al. |
| 5,306,113 A | 4/1994 | Mann |
| 5,538,308 A | 7/1996 | Floe |
| 5,634,228 A * | 6/1997 | Johnston ..................... 14/69.5 |
| 5,853,281 A | 12/1998 | Farmer |
| 6,099,233 A | 8/2000 | Craik |
| 6,119,634 A * | 9/2000 | Myrick ....................... 119/847 |
| 6,139,249 A * | 10/2000 | Lucht ......................... 414/537 |
| 6,250,874 B1 | 6/2001 | Cross |
| 6,536,064 B1 * | 3/2003 | Swink et al. ................ 14/69.5 |

* cited by examiner

*Primary Examiner*—Raymond Addie

(57) ABSTRACT

A ramp assembly includes at least one ramp having a plurality of oppositely situated side rails and a mechanism for selectively locking the ramp at an extended position. The ramp assembly further includes a mechanism for selectively articulating the ramp between a folded position and an extended position. A plurality of linear support runs having opposed end portions are secured to the side rails such that the support runs become medially positioned therebetween and define a surface area along which a vehicle can be supported. Selected ones of the support runs include mounting brackets attached thereto. A flange member is secured to one of the support runs and extends outwardly therefrom. The articulating mechanism includes a hinge member having a pair of pivotally connected plates repeatedly adaptable between the folded and extended positions respectively.

1 Claim, 3 Drawing Sheets

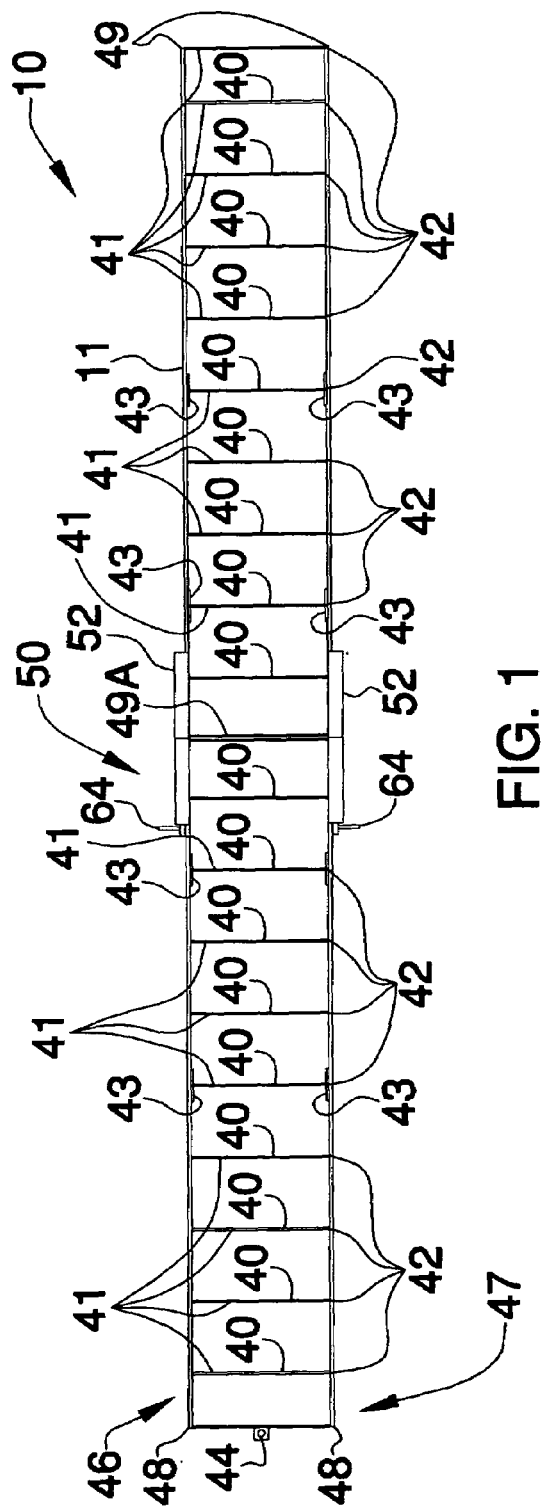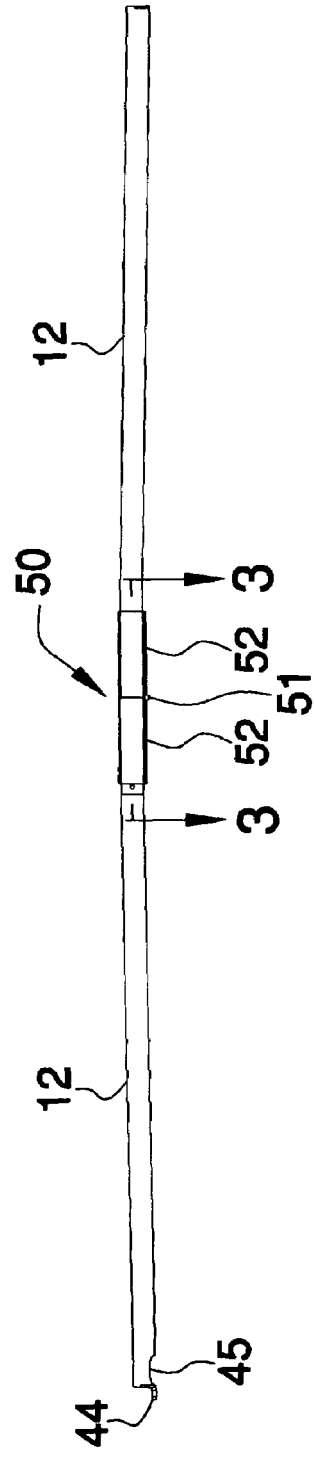

MULTI-FUNCTIONAL RAMPS

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to ramps and, more particularly, to multi-functional ramps for assisting a user in performing a variety of recreational tasks.

2. Prior Art

Various types of ramp structures have been devised and used for loading and unloading vehicles on other vehicles for transportation. Many of these prior ramp structures are hinged or otherwise mounted to the transport vehicle, and thus cannot be readily moved for use with other transport vehicles. Further, when so mounted, the transport vehicle cannot be readily used for other purposes without the mounted ramp being in the way.

For transporting a class of relatively light vehicles, such as snowmobiles, all-terrain vehicles, lawn mowers, motorcycles, and the like, transport vehicles often include towed trailers, pickup trucks, and wagons. These types of transport vehicles often have a variety of uses, only one of which may be to transport those light-weight vehicles, and mounted loading structures are unacceptable.

One type of loading apparatus involves a support surface that is movably mounted to the transport vehicle such that the support surface can be lowered to ground level to allow a vehicle to be placed thereon, and then can be raised to the level of the bed of the transport vehicle. The raising mechanisms include hydraulics, power driven cable and pulley assembles, and other forms of power structures. All of these devices add weight to the transport vehicle, remain in place unless extensive removal operations are done, are limited in use to a vehicle that is adapted to work with it, and may not be readily used with other transport vehicles.

Folding ramp structures have been developed such that the ramp is hingeably mounted to the transport vehicle, and is laterally hinged in two or more sections such that when the ramp is raised, it folds back upon itself so that it does not protrude upwardly to an unacceptable height. These types of folding ramps are most often used with very light-weight apparatuses, such as lawn mowers, because the laterally folding structure is difficult to fabricate with substantial longitudinal rigidity. Such mounted, laterally folding ramps cannot readily be moved for use with other transport vehicles.

Removable ramps have long been used with transport vehicles where the ramp has hooks or other engaging members mounted at one end of the ramp. These members are arranged for cooperating with some structure on the transport vehicle to hold the end of the ramp in place when engaged. These structures are often used with livestock trucks, and while effective, are often difficult to engage and are not readily portable to other transport vehicles.

The simplest prior art ramps are constructed of planks with one end arranged to rest on the ground and the other end to be supported on the bed of the transport vehicle. While simple, this type of ramp is dangerous in that the planks routinely slide forward when loading, such that the ground end flies up when the loaded vehicle moves to the bed of the transport vehicle and routinely slide back when unloading, such that the end supported on the bed slips off and allows the ramp and the unloading vehicle to fall to the ground. Neither of these results is acceptable.

None of the prior art ramp structures are adequate or designed to provide safety and flexibility of use with a variety of transport vehicles. Various prior art ramps have been constructed of wood, which decays and loses strength, or steel, which is heavy and tends to rust. Most are too heavy to be used by anyone other than very strong people.

Accordingly, a need remains for a multi-functional ramp to overcome the above-noted shortcomings. The present invention satisfies such a need by providing a ramp assembly for assisting a user in performing a variety of recreational tasks. Such a ramp assembly would be convenient, safe, affordable, portable, and have a wide range of uses. Instead of leaning unsteady planks or other makeshift ramps against the tailgate to drive a lawn tractor, ATV, or some other heavy equipment into the truck bed, the ramp assembly could be used. The long, stable ramp members would ensure maximum stability and safe ascension without accidental shifting or falling.

BRIEF SUMMARY OF THE INVENTION

In view of the foregoing background, it is therefore an object of the present invention to provide an apparatus for loading recreational equipment onto the bed of a truck. These and other objects, features, and advantages of the invention are provided by a ramp assembly for assisting a user to perform a plurality of recreational tasks. The ramp assembly includes at least one ramp having a centrally disposed longitudinal axis and further having a plurality of oppositely situated side rails equally spaced from the axis and extending parallel to the axis.

The ramp assembly further includes a mechanism for selectively locking the ramp at an extended position such that an external load can be supported thereon during operating conditions. The ramp assembly further includes a mechanism for selectively articulating the ramp between a folded position and an extended position such that the length of the ramp becomes reduced by approximately fifty percent when the ramp is articulated to the folded position.

A plurality of linear support runs having opposed end portions are secured to the side rails such that the support runs become medially positioned therebetween and define a surface area along which a vehicle can be supported. The support runs traverse the axis and are equally spaced along the length of the ramp. Selected ones of the support runs include mounting brackets attached thereto so that external load forces can be distributed to the side rails during operating conditions. A flange member is secured to one of the support runs and extends outwardly therefrom for receiving a fastener therethrough such that the ramp can be effectively attached to a support surface.

At least one of the side rails is preferably provided with an arcuate notch sized and shaped for receiving a selected portion of a vehicle tailgate during loading and unloading procedures. The side rails include substantially symmetrical first and second sections aligned end-to-end wherein a first pair of the first and second sections extend along approximately a first half-length of the ramp and a second pair of the first and second sections extend along a second half-length of the ramp.

The articulating mechanism includes a hinge member having a pair of pivotally connected plates repeatedly adaptable between the folded and extended positions respectively. Such hinge plates are secured to the first and second sections such that the hinge plates are situated adjacent a medial end portion of the first and second sections respectively and centered along the length of the ramp.

The locking mechanism includes a plurality of elongated brackets secured to an exterior wall of the side rails respectively. Each of the brackets have an axial bore formed therein traveling substantially parallel to the side rails respectively. The locking mechanism further includes a plurality of elongated handles sized and shaped for being slidably positioned through the bores respectively such that a medial portion of each of the handles becomes positioned across the hinges and thereby prevents the first and second rail sections from articulating beyond the extended position during operating conditions. The brackets and the handles extend outwardly away from the side rails so that an unobstructed travel path can be defined along the runs.

Each of the handles preferably includes integrally mated first and second portions situated substantially orthogonal to each other such that one of the first and second portions extend outwardly from the brackets for providing a grip surface along which a user may adapt the handles between engaged and disengaged positions.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a top plan view showing a ramp assembly, in accordance with the present invention;

FIG. 2 is a side elevational view of the apparatus shown in FIG. 1;

DETAILED DESCRIPTION OF THE INVENTION

Figure 4:
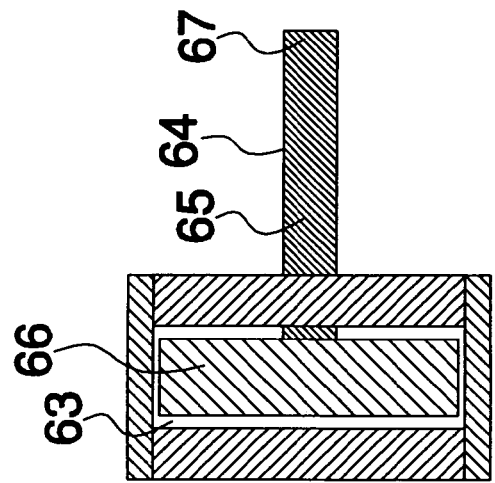
FIG. 4 is a cross-sectional view of the locking mechanism, taken along line 4—4.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1–5 by the reference numeral 10 and is intended to provide a ramp assembly for loading recreational equipment onto the bed of a truck. It should be understood that the assembly 10 may be used to provide ramps for many different applications and to perform a plurality of recreational tasks.

Initially referring to FIGS. 1 and 2, the assembly 10 includes at least one ramp 11 having a centrally disposed longitudinal axis (not shown) and further has a plurality of oppositely situated side rails 12 equally spaced from the axis and extending parallel to the axis. Such ramps 11 enable heavy machines and equipment like lawn tractors and ATVs, for example, to be easily loaded and unloaded from the bed of a truck in a safe and controlled manner, thereby preventing injury to a user and damage to the equipment. The ramps 11 may also be used for other functions such as tracking in the mud, as a portable bridge, as ladders, for crossing fallen trees, or as a land bridge over ice. Such ramps 11 are preferably formed from aluminum because of its light weight, high strength, and resistance to corrosion.

Referring to FIGS. 1 and 2, the ramp assembly 10 further includes a mechanism 20 for selectively locking the ramp 10 at an extended position such that an external load can be supported thereon during operating conditions. The ramp assembly 10 further includes a mechanism 30 for selectively articulating the ramp 10 between a folded position and an extended position such that the length of the ramp 10 becomes reduced by approximately fifty percent when the ramp 10 is articulated to the folded position. This feature enables a user to conveniently store the assembly 10 when not in use in a compacted position that requires less space.

Figure 3:
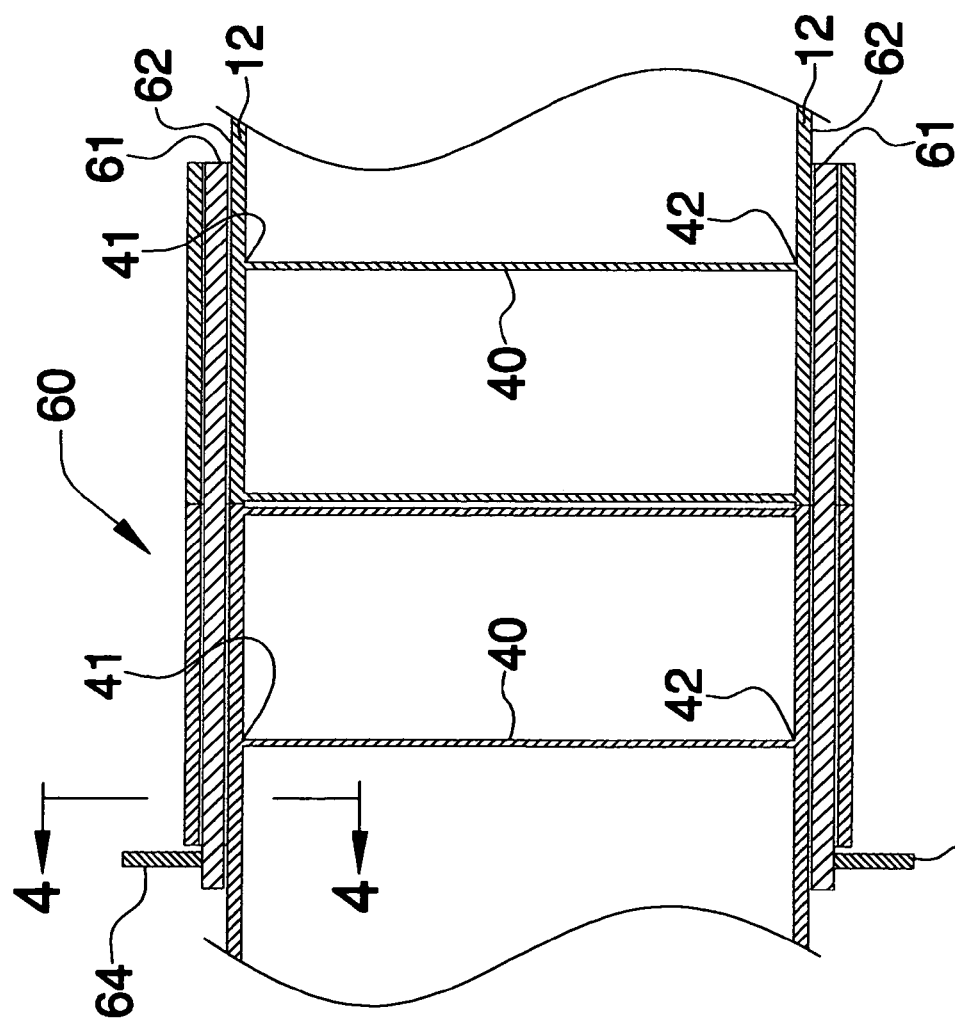
FIG. 3 is a cross-sectional view of the articulating mechanism, taken along line 3—3.

Referring to FIGS. 1 and 3, a plurality of linear support runs 40 having opposed end portions 41, 42 are secured to the side rails 12 such that the support runs 40 become medially positioned therebetween and define a surface area along which a vehicle can be supported. The support runs 40 traverse the axis and are equally spaced along the length of the ramp 10. Selected ones of the support runs 40 include mounting brackets 43 attached thereto so that external load forces can be distributed to the side rails 40 during operating conditions. Such support runs serve as traction grips for the pneumatic tires of equipment being loaded or unloaded and provide strength and rigidity to the assembly 10 when extended. A flange member 44 is secured to one of the support runs 40 and extends outwardly therefrom for receiving a fastener (not shown) therethrough such that the ramp 10 can be effectively attached to a support surface. Such a fastener may be a bolt or clevis pin, preferably formed from hardened steel, as well known in the industry.

Referring to FIG. 2, at least one of the side rails 12 is provided with an arcuate notch 45 sized and shaped for receiving a selected portion of a vehicle tailgate during loading and unloading procedures. Such a notch 45 may also be used to receive a crossbar of a fence or other support rod. The side rails 40 include substantially symmetrical first 46 and second 47 sections aligned end-to-end wherein a first pair 48 of the first 46 and second 47 sections extend along approximately a first half-length of the ramp 10 and a second pair 49 of the first 46 and second 47 sections extend along a second half-length of the assembly 10.

Figure 5:
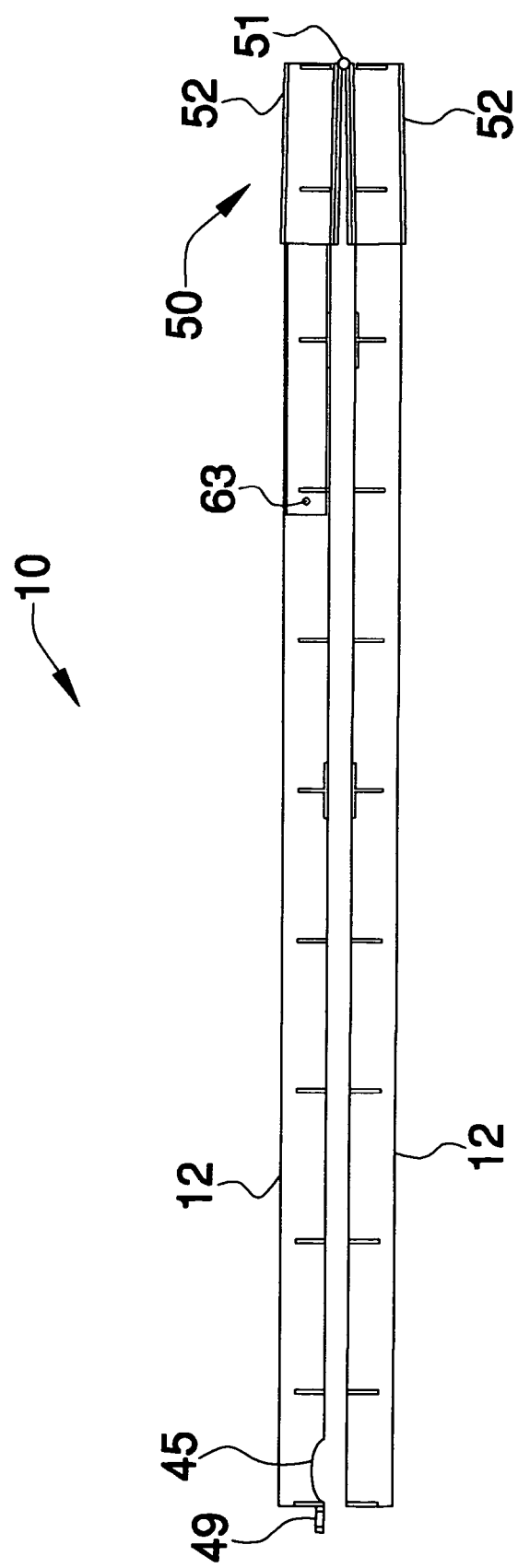
FIG. 5 is a side elevational view of the ramp assembly shown in FIG. 1, at a folded position.

Referring to FIGS. 1, 2 and 5, the articulating mechanism 50 includes a hinge member 51 having a pair of pivotally connected plates 52 repeatedly adaptable between the folded and extended positions respectively. Such hinge plates 52 are secured to the first 46 and second 47 sections such that the hinge plates 52 are situated adjacent a medial end portion 49A of the first 46 and second 47 sections respectively and centered along the length of the ramp 10. The hinge plates 52 provide rigidity and support when the assembly 10 is at an extended position.

Referring to FIGS. 3 through 5, the locking mechanism 60 includes a plurality of elongated brackets 61 secured to an exterior wall 62 of the side rails 12 respectively. Each of the brackets 61 have an axial bore 63 formed therein traveling substantially parallel to the side rails 40 respectively, as best shown in FIG. 5. The locking mechanism 60 further includes a plurality of elongated handles 64 sized and shaped for being slidably positioned through the bores 63 respectively such that a medial portion 65 of each of the handles 64 becomes positioned across the hinges 52 and thereby prevents the first 46 and second 47 rail sections from articulating beyond the extended position during operating conditions.

The brackets 61 and the handles 64 extend outwardly away from the side rails 12 so that an unobstructed travel path can be defined along the runs 12. Each of the handles 64 includes integrally mated first 66 and second 67 portions situated substantially orthogonal to each other such that one of the first 66 and second 67 portions extend outwardly from the brackets 61 for providing a grip surface along which a user may adapt the handles 64 between engaged and disengaged positions. The handles 64 are easily grasped by a user, thus providing safety and convenience.

The assembly 10 is strong, reliable, adjustable, and adaptable to different types of wheeled equipment. Such an assembly is preferably capable of supporting loads up to 1,200 pounds, thus making it a useful and versatile apparatus for any recreational or commercial user.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A ramp assembly for assisting a user to perform a plurality of recreational tasks, said ramp assembly comprising:

at least two ramps having a centrally disposed longitudinal axis and further having a plurality of oppositely situated side rails equally spaced from the axis and extending parallel to the axis;

means for selectively locking said ramps at an extended position such that an external load can be supported thereon during operating conditions;

means for selectively articulating said ramps between a folded position and the extended position such that the length of said ramps becomes reduced by approximately fifty percent when said ramps is articulated to the folded position;

a plurality of linear support runs having opposed end portions secured to said side rails such that said support runs become medially positioned therebetween and define a surface area along which a vehicle can be supported, said support runs traversing the axis and being equally spaced along the length of said ramps, selected ones of said support runs include mounting brackets attached thereto so that external load forces can be distributed to the side rails during operating conditions; and a flange member secured to one said support runs and extending outwardly therefrom for receiving a fastener therethrough such that said ramps can be effectively attached to a support surface;

wherein at least one said side rails is provided with an arcuate notch sized and shaped for receiving a selected portion of a vehicle tailgate during loading and unloading procedures;

wherein each said side rails comprises substantially symmetrical first and second sections aligned end-to-end wherein a first pair of said first and second sections extend along approximately a first half-length of said ramps and a second pair of said first and second sections extend along a second half-length of said ramps;

wherein said articulating means comprises a hinge member having a pair of pivotally connected plates repeatedly adaptable between the folded and extended positions respectively, said hinge plates being secured to said first and second sections such that said hinge plates are situated adjacent a medial end portion of said first and second sections respectively and centered along the length of said ramps;

wherein said locking means comprises a plurality of elongated brackets secured to an exterior wall of said side rails respectively, each said bracket having an axial bore formed therein and traveling substantially parallel to said side rails respectively, and a plurality of elongated handles sized and shaped for being slidably positioned through the bores respectively such that a medial portion of each said handles become positioned across said hinges and thereby prevent said first and second rail sections from articulating beyond the extended position during operating conditions;

wherein said brackets and said handles extend outwardly away from said side rails so that an unobstructed travel path can be defined along the runs;

wherein each said handle comprises integrally mated first and second portions situated substantially orthogonal to each other such that one said first and second portions extend outwardly from said brackets for providing a grip surface along which a user may adapt said handles between engaged and disengaged positions;

wherein said second portion of each of said handles is spaced from said ramps and freely detachable from said ramps;

wherein each of said brackets includes a planar body equidistantly spaced outwardly from said side rails.

* * * * *